United States Patent [19]

Hahn et al.

[11] Patent Number: 5,018,683
[45] Date of Patent: May 28, 1991

[54] SYSTEM FOR CONTROLLING TURBULENCE INSIDE AND JUST OUTSIDE A CAVITY

[75] Inventors: Mansop M. Hahn; Jerry L. Lundry, both of Bellevue; Larry W. Mohn, Edmonds, all of Wash.

[73] Assignee: The United States of America as represented by the Secretary of the Army, Washington, D.C.

[21] Appl. No.: 589,822

[22] Filed: Sep. 27, 1990

[51] Int. Cl.$^5$ .............................................. B64C 1/14
[52] U.S. Cl. ...................................... 244/1 R; 244/130;
244/129.3; 372/104; 350/319; 350/584
[58] Field of Search ................. 244/1 R, 129.1, 129.3,
244/117 R, 130, 198, 207, 200; 350/319, 358,
584; 372/104

[56] References Cited

U.S. PATENT DOCUMENTS

| H324 | 9/1987 | Rubin | 244/117 |
| H501 | 4/1988 | Rubin | 244/1 |
| 2,721,715 | 10/1955 | Hoadley | 244/130 |
| 4,245,803 | 1/1981 | De Blois | 244/53 B |
| 4,703,904 | 11/1987 | Haslund | 244/1 R |

*Primary Examiner*—Joseph F. Peters, Jr.
*Assistant Examiner*—Carla Mattex
*Attorney, Agent, or Firm*—Freddie M. Bush; Robert L. Broad

[57] ABSTRACT

A system for controlling fluid turbulence inside and just outside of a cavity adjacent to an opening in a wall, the wall having a forward lip which defines the leading edge of the opening and an aft lip having a leading edge which defines the trailing edge of the opening, the forward lip terminating in a sharp edge lying generally in the plane of the outer surface of the wall. The aft lip has a length of 10 to 50% of the length of the opening and extends into the opening at an angle of 30 to 60 degrees to terminate in an arcuate portion having a radius of 2 to 6% of the length of the opening.

4 Claims, 1 Drawing Sheet

SYSTEM FOR CONTROLLING TURBULENCE INSIDE AND JUST OUTSIDE A CAVITY

DEDICATORY CLAUSE

The invention described herein was made in the course of or under a contract or subcontract thereunder with the Government and may be manufactured, used and licensed by or for the Government for governmental purposes without the payment to me of any royalties thereon.

SUMMARY OF THE INVENTION

1. Field of the Invention

This invention relates o a system for controlling fluid turbulence in a cavity in a wall over which air or another fluid is flowing, including turbulence inside and just outside of the cavity. This system will be described in terms of air flow past an opening in an aircraft surface, although it applies generally to any gas or liquid flowing past an opening in a surface.

2. Prior Art

Sophisticated optical sensors used for observation from aircraft require open viewing ports, since no existing window material has a combination of satisfactory optical and structural properties. These optical sensors require a relatively quiet environment, free aerodynamic turbulence, mechanical vibration and noise. High speed air flow across the open port must not create excessive turbulence in the cavity.

When the air flow past an open port or door is unstable the air can move rapidly into and out of the cavity. An especially severe disturbance can be created in the cavity when the acoustical resonant frequency of the cavity is excited by the external flow of air.

Various systems have been used to lower turbulence in such a cavity. United States Statutory Invention Registration No. H501 discloses a system which uses an arcuate flange at the rear edge of an opening over which air flows, the flange extending into the cavity adjacent to the open port.

Another system which has been used for this purpose uses a perforated flange which extends outwardly from the surface of the aircraft at a location forward of the open port. This porous spoiler has the disadvantage that it greatly increases aerodynamic drag and can produce pressure fluctuations which can be transmitted into the cavity.

U.S. Pat. No. 4,703,904 discloses apparatus and a method of controlling a shear layer in air flowing past a cavity adjacent to a opening in a surface over which air is flowing. In this system, air from another location on the aircraft is introduced into the cavity and made to flow from the cavity outward through the opening, an air scoop at another location on the aircraft serving to collect the air which is forced into the cavity. The disadvantage of this system is that the air scoop increases drag and additional ducting and other equipment is required, thereby increasing weight, cost and complexity.

SUMMARY OF THE INVENTION

A system for controlling fluid turbulence inside and just outside of a cavity adjacent to an opening in a wall, the wall having a forward lip which defines the leading edge of the opening and an aft lip which defines the trailing edge of the opening, the forward lip having a sharp edge lying in the plane of the wall. The aft lip has a length of 10 to 50% of the length of the opening and extends into the cavity at an angle of 30 to 60 degrees to terminate in a portion having an arcuate cross section with a radius of 2 to 6% of the length of the opening.

DETAILED DESCRIPTION OF THE INVENTION

Figure 1:
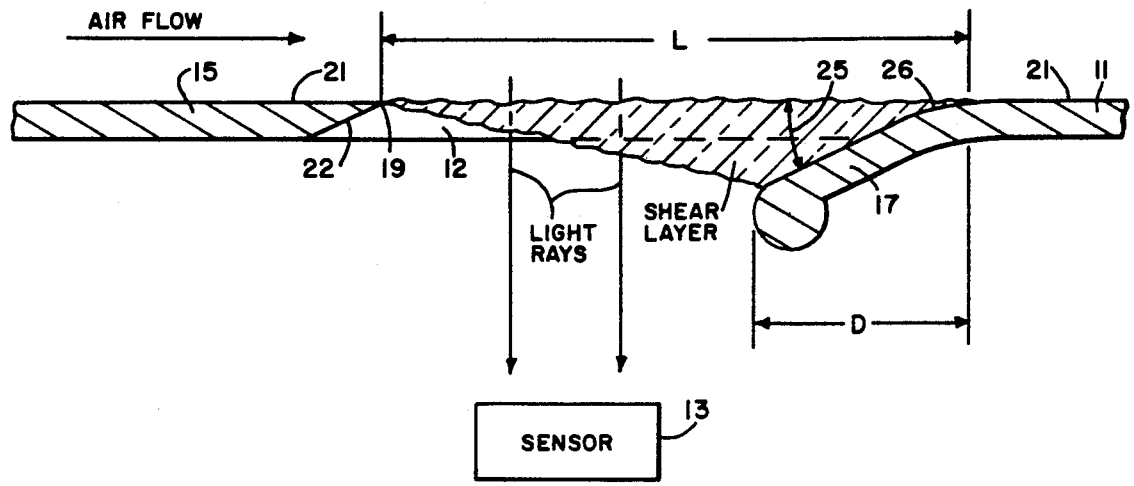
FIG. 1 is a cross sectional view of a portion of a wall of an aircraft showing wall structure which defines an opening in the wall in accordance with the principles of this invention.
Figure 2:
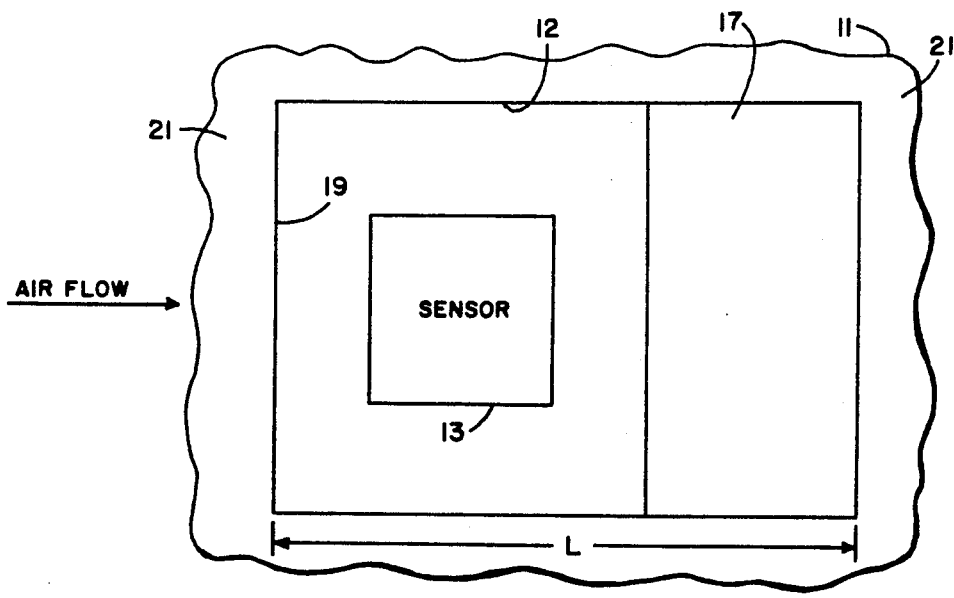
FIG. 2 is a fragmentary top view of the structure of FIG. 1 showing the configuration of the opening in the aircraft wall.

Referring now in detail to the drawing, there is shown a portion of an aircraft wall 11 having therein an opening 12 over which an aerodynamic shear layer passes and through which light rays from a distant object can pass to fall on a sensor 13 of a known type. The interior of the aircraft adjacent to the opening 12 is a cavity in which the sensor 13 is mounted and in which the lowest possible aerodynamic turbulence is desired, and over which the lowest possible turbulence in the shear layer is desired.

The wall 11 is provided with a forward lip 15 which defines the leading edge of the opening 12 and an aft lip 17 which defines the trailing edge of the opening 12, these edges being generally perpendicular to the direction of air flow over the opening.

The forward lip 15 is provided with a sharp edge 19 lying generally in the plane of the outer surface of the wall 11, such that air flowing past this lip does not cause the thick, viscous wake that a blunt lip would form. By "sharp" we mean that the wall 11 is provided with a surface 22 which meets the outer surface 21 of the wall 11 at an acute angle, preferably less than 45 degrees, to form the edge 19. The advantage of a thinner, less viscous wake is that the shear layer flowing past the opening 12 is thinner, so that optical distortion of light passing through the opening 12 into the cavity is reduced.

The aft lip 17 is in the form of a flange which extends into the cavity behind the opening at an angle of 30 to 60 degrees and extends along the opening 12 a distance, D, of 10 to 50% of the length of the opening 12. This angle is indicated by reference numeral 25 in FIG. 1.

The leading edge of the aft lip 17 is blunt in configuration to insure that the shear layer formed by detachment of the air stream from the forward lip will stably re-attach to the aft lip without undue turbulence within the shear layer itself and in the interior of the aircraft adjacent to the opening 12. It has been found that the cross sectional configuration of the leading edge of the aft lip 17 should be arcuate with a radius of 2 to 6% of the length of the opening 12.

Tests have shown that this blunt leading edge of the aft lip 17 results in less turbulence and lower noise levels than other shapes. It is believed that this is caused by the fact that any air flowing into the cavity will flow more smoothly over a rounded surface than over a shape edge. Also, the air stream that separates from the sharp edge 19 of the forward lip 15 appears to re-attach to a rounded surface better than it would to a sharp edge.

The flange 17 is connected to the wall 11 by an arcuate portion 26 which has a radius of 10 to 50% of the length of the opening 12. This curved surface promotes a smooth flow of air from the flange onto the surface 21 of the wall 11.

The use of the wall configuration described herein results in low turbulence and noise levels in the shear layer flowing past the opening 12 and in the cavity, with the result that there is less optical distortion in light passing through the opening to fall on the sensor 13.

What is claimed is:

1. A system for controlling turbulence in a fluid shear layer flowing past an opening in a wall, comprising
    a. a wall having therein an opening over which the fluid flows, said opening being defined by a forward lip of the wall, said forward lip defining the leading edge of the opening, said wall also having an aft lip with a leading edge, said aft lip defining the trailing edge of the opening, said aft lip extending into the opening at an angle of 30 to 60 degrees and having a length of 10 to 50% of the latch of said opening, said leading edge of said aft lip having an arcuate cross section.

2. The system of claim 1 wherein the arcuate leading edge of the aft lip has a radius of 2 to 6% of the length of said opening.

3. The system of claim 2 wherein the forward lip terminates in a sharp edge lying generally in the plane of the outer surface of the wall.

4. The system of claim 3 wherein the aft lip is connected to the wall downstream of the opening by a curved portion having a radius of 10 to 50% of the length of the opening.

* * * * *